United States Patent [19]

Singhal et al.

[11] Patent Number: 5,252,199

[45] Date of Patent: Oct. 12, 1993

[54] HYDROTREATING PROCESS USING NOVEL MULTIMETALLIC SULFIDE CATALYSTS

[75] Inventors: Gophal H. Singhal; Leo D. Brown; X. B. Cox, III; Thomas R. Halbert, all of Baton Rouge, La.

[73] Assignee: Exxon Research & Engineering Company, Florham Park, N.J.

[21] Appl. No.: 590,827

[22] Filed: Oct. 1, 1990

[51] Int. Cl.⁵ .............................................. C10G 45/08
[52] U.S. Cl. .................... 208/254 H; 208/216 R; 208/215; 208/217
[58] Field of Search ................ 208/254 H, 216 R

[56] References Cited

U.S. PATENT DOCUMENTS

| | | | |
|---|---|---|---|
| 4,352,729 | 10/1982 | Jacquin | 208/251 H |
| 4,414,141 | 11/1983 | Schindler | 208/254 H |
| 4,435,278 | 3/1984 | Chen | 208/251 H |
| 4,540,481 | 9/1985 | Sawyer et al. | 208/254 H |
| 4,544,481 | 10/1985 | Seiver et al. | 208/254 H |
| 4,581,127 | 4/1986 | Varghese | 208/143 |
| 4,698,145 | 10/1987 | Ho et al. | 208/254 H |
| 4,705,619 | 11/1987 | McCandlish et al. | 208/254 H |
| 4,717,705 | 1/1988 | Kimp | 208/254 H |
| 4,740,295 | 4/1988 | Bearden, Jr. et al. | 208/254 H |
| 4,863,887 | 9/1989 | Ohtake et al. | 208/251 H |
| 4,945,079 | 7/1990 | Pederson et al. | 208/254 H |
| 4,960,506 | 10/1990 | Halbert et al. | 208/254 H |
| 5,037,532 | 8/1991 | Winter, Jr. et al. | 208/143 |
| 5,039,392 | 8/1991 | Bearden et al. | 208/254 H |

*Primary Examiner*—Helane Myers
*Attorney, Agent, or Firm*—Henry E. Naylor

[57] ABSTRACT

The present invention relates to a process for removing hetero-atoms from a hydrocarbonaceous feedstock using novel catalysts comprised of highly dispersed molybdenum sulfide promoted with a noble metal such that the noble metal is in an oxidation state greater than 0 and coordinated to S. The noble metal is selected from Pt, Pd, Rh, and Ir. It is preferred that the catalysts of be prepared from a precursor composition selected from platinum ethoxyethyl xanthate or platinum dithiocarbamate. Additionally, the catalyst may include a promotor sulfide such as nickel sulfide, cobalt sulfide or iron sulfide, etc. or mixtures thereof.

12 Claims, 6 Drawing Sheets

HYDROTREATING PROCESS USING NOVEL MULTIMETALLIC SULFIDE CATALYSTS

FIELD OF THE INVENTION

The present invention relates to a hydrotreating process for the removal of heteroatoms, especially nitrogen, from petroleum and synthetic fuel feedstocks. The catalyst is an unsupported catalyst comprised of highly dispersed molybdenum sulfide, and a noble metal in an oxidation state of greater than zero, preferably greater than one, coordinated primarily to sulfur. Additionally, the catalyst may include a promoter metal sulfide, such as nickel sulfide, cobalt sulfide, iron sulfide, or a mixture thereof. It is critical that the sulfides of the various metals are intimately mixed and highly dispersed.

BACKGROUND OF THE INVENTION

Hydrotreating of petroleum feedstocks and various boiling fractions thereof has become increasingly important because of more stringent product quality requirements. Furthermore, the petroleum industry foresees the time when it will have to turn to relatively high boiling feeds derived from such materials as coal, tar sands, oil-shale, and heavy crudes. Feeds derived from such materials generally contain significantly more deleterious components, such as sulfur, nitrogen, oxygen, halides, and metals. Consequently, such feeds require a considerable amount of upgrading in order to reduce the content of such components, thereby making them more suitable for further processing, such as fluid catalytic cracking and/or cracking and/or catalytic reforming.

Hydrotreating is well known in the art and usually requires treating a hydrocarbonaceous feed with hydrogen in the presence of a catalyst to effect conversion of at least a portion of the feed to lower boiling products, usually with removal of deleterious components. See for example U.S. Pat. No. 2,914,462 which discloses the use of molybdenum sulfide for hydrode-sulfurizing gas oil and U.S. Pat. No. 3,148,135 which discloses the use of molybdenum sulfide for hydrorefining sulfur and nitrogen-containing hydrocarbon oils. Further, U.S. Pat. No. 2,715,603 discloses the use of molybdenum sulfide as a catalyst for the hydrogenation of heavy oils, and U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc. reactions.

In general, with molybdenum and other transition metal sulfide catalysts, as well as with other types of catalysts, greater catalyst surface areas generally result in more active catalysts than similar catalysts with lower surface areas. Thus, those skilled in the art are constantly trying to achieve catalysts having ever greater surface areas. More recently, it has been disclosed in U.S. Pat. Nos. 4,243,553 and 4,243,554 that molybdenum sulfide catalysts of relatively high surface area may be obtained by thermally decomposing selected thiomolybdate salts at temperatures ranging from about 300° to 800° C. in the presence of essentially inert, oxygen-free atmospheres. Suitable atmospheres are disclosed as consisting of argon, a vacuum, nitrogen, and hydrogen. In U.S. Pat. No. 4,243,554, an ammonium thiomolybdate salt is decomposed at a rate in excess of 15° C. per minute, whereas in U.S. Pat. No. 4,243,553, a substituted ammonium thiomolybdate salt is thermally decomposed at a substantially slower heating rate of about 0.5° to 2° C. per minute. The processes disclosed in these patents are claimed to produce molybdenum disulfide catalysts having superior properties for water gas shift and methanation reactions as well as for catalyzed hydrogenation and hydrotreating reactions.

Hydrotreating catalysts comprising molybdenum sulfide, in combination with other metal sulfides, are also known. For example, U.S. Pat. No. 2,891,003 discloses an iron-chromium composition for desulfurizing olefinic gasoline fractions. Further, U.S. Pat. No. 3,116,234 discloses Cr-Mo and also Mo with Fe and/or Cr, and/or Ni for hydrodesulfurization. Also, U.S. Pat. No. 3,265,615 discloses Cr-Mo for hydrodenitrogenation and hydrodesulfurization.

Hydrotreating catalysts containing platinum are also known. For example, U.S. Pat. No. 3,422,002 discloses hydrotreating with a catalyst consisting essentially of 0.05 to 5 wt. % of a platinum series metal and about 4 to 30 wt. % of molybdena on alumina, the catalyst having been presulfided.

While various of these catalysts have met with commercial success, there still exists a need in the art for hydrotreating processes using catalysts having ever improved properties with respect to hydrodenitrogenation over those conventionally used.

SUMMARY OF THE INVENTION

In accordance with the present invention, there are provided an improved hydrotreating process form removing heteroatoms, particularly nitrogen, from hydrocarbonaceous feedstocks by use of novel catalysts comprised of highly dispersed molybdenum sulfide promoted with a noble metal such that the noble metal is in an oxidation state greater than 0 and coordinated primarily to S. The molybdenum sulfide can, in addition, be promoted by sulfides of one or more of metals from Ni, Co, Fe, etc.

In preferred embodiments of the present invention, the noble metal is selected from Pt, Pd, Rh, and Ir.

In other preferred embodiments of the present invention, the noble metal is platinum and is in an oxidation state greater than 1, and in an amount from about 0.1 to 10.0 wt. % of the total catalyst, with a molar ratio of platinum to molybdenum of about 0.001 to 0.10.

In still other preferred embodiments of the present invention, the amount of platinum present is about 0.25 to 5.0 wt. % of the total catalyst and the molar ratio of platinum to molybdenum is about 0.0025 to 0.05. When one or more of Ni, Co or Fe are present, the molar ratio of Ni, Co, or Fe/Mo can vary over a wide range but would generally be from 0.1 to 0.5.

In yet other embodiments of the present invention, the catalysts are prepared from: (a) one or more noble metal complexes; (b) one or more molybdenum complexes; and (c) optionally one or more soluble, or easily dispersible, complexes of Ni, Co and Fe, etc. The noble metal complexes are selected from those represented by the formula $ML_2$, when the noble metal is Pt or Pd; and $ML_3$, when the noble metal is Rh or Ir; where M is the noble metal and L is a ligand selected from dithiocarbamates, dithiophosphates, xanthates, thioxanthates, and further wherein L has organo groups having a sufficient number of carbon atoms to render the noble metal complex soluble in oil. Similarly, Ni complexes will be $ML_2$ and Co and Fe complexes of the type $ML_3$. The molybdenum complex is also oil soluble and/or highly dispersible and is selected from $$MoO_2(S_2CNR_2)_2$$

where R is a $C_1$ to $C_{18}$ alkyl group, a $C_5$ to $C_8$ cycloalkyl group, a $C_6$ to $C_{18}$ alkyl substituted cycloalkyl group, or a $C_6$ to $C_{18}$ aromatic or alkyl substituted aromatic group, or $$Mo_2O_2(\mu\text{-}S)_2(S_2CNR_2)_2$$

where R is as indicated, or any related complex of molybdenum with dithiocarbamate, dithiophosphate, xanthates, or thioxanthate ligands.

In another preferred embodiment of the present invention, the noble metal complex is bis(2-ethoxyethylxanthato)Pt and the molybdenum complex is dioxo bis(n-dibutyldithiocarbamato)$MoO_2^{VI}$, sometimes herein referred to as dioxoMoDTC.

In still other preferred embodiments of the invention, the noble metal complex is bis(di-n-butyldithiocarbamato) Pt and the molybdenum complex is $Mo_2O_2(\mu\text{-}S)_2(S_2CNR_2)_2(R=\text{n-butyl})$.

DETAILED DESCRIPTION OF THE INVENTION

Figure 1:
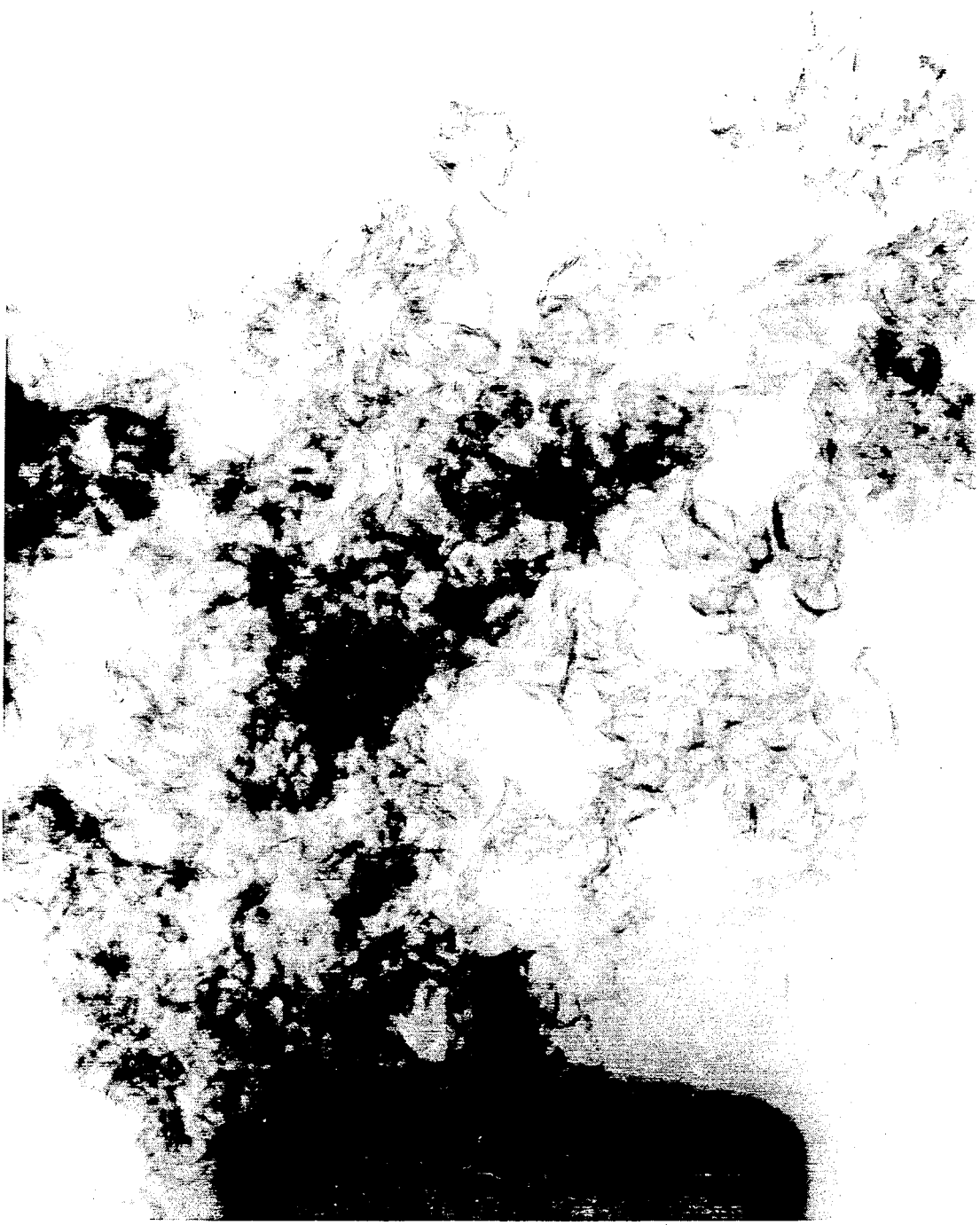
FIG. 1 is an electron micrograph of the catalyst of Example 4 hereof.

A variety of feedstocks can be hydrotreated with the catalysts of the present invention, including hydrocarbonaceous fractions and whole feeds. Non-limiting examples of such feeds include organic solvents, light, middle and heavy distillates, and residual feeds.

In the practice of the present invention, a feed with a high heteroatom content, especially a high nitrogen concentration feedstream, is contacted with hydrogen at hydrodenitrogenation conditions in the presence of an unsupported slurry catalyst. The catalyst is comprised of a highly dispersed molybdenum sulfide and a noble metal such that the noble metal is in an oxidation state greater than 0, preferably greater than 1 and coordinated primarily to S. The catalyst optionally contains a sulfide of a promoter metal such as Ni, Co, or Fe. By highly dispersed, we mean that the molybdenum sulfide exists as small ($<50$ $\mu m$) particles which do not appear to be crystalline as measured by any conventional analytical technique, such as X-ray diffraction (XRD). These highly dispersed particles have more catalytically active sites per gram of molybdenum than larger particles do. Further, the noble metal is present in an amount from about 0.1 to about 10.0 wt. %, based on the total weight of the catalyst. Preferably, about 0.25 to about 5.0 wt. % of noble metal is present. Also, the noble metal is present in the above amount such that the molar ratio of noble metal to molybdenum is from about 0.001 to about 0.1, preferably from about 0.0025 to about 0.05. The noble metal will be coordinated primarily to sulfur of the ligands. By coordinated primarily to sulfur of the ligands, we mean that the noble metal will be in an oxidation state greater than 0, preferably greater than 1, and most preferably greater than 2. This high oxidation state will be provided by coordination with S, which can be verified by an analytical technique such as X-ray photoelectron spectroscopy (XPS) and/or Extended X-ray Absorption Fine Structure (EXAFS). Noble metals suitable for use herein include platinum, palladium, rhodium, and iridium. Preferred are platinum and rhodium, and more preferred is platinum.

The catalysts of the present invention are prepared from catalyst precursors. The noble metal precursor can be represented by:

$ML_2$ when M is Pt or Pd, and
$ML_3$ when M is Rh or Ir where L is a ligand selected from the dithiocarbamates, dithiophosphates, xanthates, and the thioxanthates, wherein L contains organo groups having a sufficient number of carbon atoms to render the noble metal complex soluble or highly dispersed in a hydrocarbonaceous solvent or feedstock. For example, the organo group can be selected from alkyl, aryl, substituted aryl, and ether groups. Generally, the number of carbon atoms of the organo group will be from about 4 to 30. Preferred are the dithiocarbamates and the xanthates. For example, the alkoxyalkylxanthates represented by the formula:

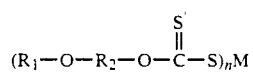

where $R_1$ is an alkyl group (straight, branched, or cyclic); an alkoxy substituted alkyl group; an aryl group; or a substituted aryl group, $R_2$ is a straight or branched alkylene group, M is the noble metal, n is an integer from 1 to 4, and is equal to the oxidation state of the metal Preferably, $R_1$ is a straight chain alkyl group, a branched alkyl group, or an alkoxy substituted alkyl group. Most preferably, $R_1$ comprises a straight chained alkyl group. Although the number of carbon atoms in $R_1$ can vary broadly, typically $R_1$ will have from 1 to 24, preferably from 2 to 12, and more preferably from 2 to 8, carbon atoms. Typically, $R_2$ will have from 2 to 8, preferably from 2 to 4, carbon atoms. Most preferably, $R_1$ and $R_2$ will each have from 2 to 4 carbon atoms. $R_1$ and $R_2$ together should contain a sufficient number of carbon atoms such that the metal alkoxyalkylxanthate is soluble in the oil. Examples of suitable substituted groups in $R_1$ include alkyl, aryl, alkylthio, ester groups, and the like.

M can be a variety of metals, but, in general, will be a metal selected from the group consisting of Pt, Pd, Rh, Ru and Ir.

Examples of the various metal alkoxyalkylxanthates that can be used in the practice of the present invention are platinum bis(ethoxyethylxanthate), platinum butoxyethylxanthate, platinum propyloxyethylxanthate, platinum isopropyloxyethylxanthate, platinum 2-ethylhexyloxyxanthate, Rh trisethoxyethylxanthate, Rh trisbutoxyethylxanthate, Rh tris(2-ethoxyethalxanthate) etc.

Noble metal dithiocarbamates can be represented by the formula

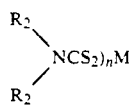

where $R_1$ and $R_2$ can be the same or different and are selected from $C_1$ to $C_{16}$ alkyl group, preferably $C_2$ to $C_8$ alkyl group
$C_6$ to $C_{18}$ aryl or alkyl substituted aryl group
where n is equal to 2, M is Pt or Pd when n=3, M is Rh or Ir most preferred metal being Pt The molybdenum complex is also oil soluble and oil dispersible, and can be selected from any of a large number of such complexes commonly known to be useful as lubricant additives (see for example Y. Yamamoto, et al. *Wear* (1986), p. 79-87, M. Umemura, et al. U.S. Pat. No. 4,692,256 (1987) and A. Papay, et al. U.S. Pat. No. 4,178,258 (1979). Preferred molybdenum complexes are those containing dithiocarbamate, dithiophosphate, xanthates, or thioxanthate ligands. Most preferred are Mo complexes selected from those represented by the formulas:

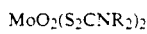

where R is a $C_1$ to $C_{18}$ alkyl group, preferably for $C_3$ to $C_{12}$ alkyl group; a $C_5$ to $C_8$ cycloalkyl group, a $C_6$ to $C_{18}$ alkyl substituted cycloalkyl group, or a $C_6$ to $C_{18}$ aromatic or alkyl substituted aromatic group or

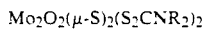

where R is as indicated above, and $\mu$-S denotes a sulfide ($S^{2-}$) ligand bridging the two molybdenum atoms.

Ni and Co complexes can be selected from the xanthate or dithiocarbamate group given above; Ni, Co and Fe can also be selected from dithiocarbamates as given for noble metals.

Thermal decomposition of the aforesaid soluble complexes in a hydrocarbon liquid results in formation of active catalyst. Ratios of complexes can be varied over a wide range given the desired ratio of metals. Suitable hydrocarbon liquids include, but are not limited to, various petroleum and coal liquid distillate fractions such as naphtha, mid-distillate or vacuum gas oil. Pure liquids such as 1-methylnaphthalene, xylenes and tetralin can also be used. The formation of active catalysts can be carried out in an inert atmosphere or preferably under a hydrogen pressure ranging from about 100 to 3000 psig, preferably between about 500 to 1750 psig, and at temperatures between about 400° F. to 900° F., preferably between about 650°-800° F. Ratios of solvent to catalyst precursors are not critical, but are generally chosen to be between about 3:1 to 25:1. The final catalyst is in the form of fine powder, with an average particle size of $<10\mu$, and surface areas, as measured by the B.E.T. method, in excess of 200 m²/g.

A critical feature of the catalysts of this invention is the presence of the noble metal in an oxidation state of greater than zero, and preferably greater than 1, as indicated by XPS, and in a sulfur co-ordination environment, as indicated by both XPS and EXAFS studies.

Interaction of the noble metal with the molybdenum sulfide is believed to stabilize the noble metal in this higher oxidation state sulfided form, which is necessary for achieving high catalytic activity of the catalysts of the present invention. In these new materials, the noble metals are not poisoned by the high heteroatom content of the feed and thus, their activities are maintained.

In the absence of molybdenum sulfide, the noble metal is subject to reduction to the metallic state under the conditions used in hydrotreating catalysis, this reduction being most noticeable for Pt.

The stability of the noble metal sulfide is highly unexpected in view of the published tables of thermodynamic properties, such as those given in "S. R. Shatynski, Oxidation of Metals, 11 (No. 6), 307-320 (1977)" which indicate that the Gibbs free energy of formation of PtS at 750° F. and 10/1 $H_2/H_2S$ is approximately zero. We have observed that reduction of the noble metal leads to redistribution and growth of the particles with decreased surface area. This leads to the loss of the beneficial effects of synergy between noble metal and molybdenum sulfides.

The present invention can also be practiced by introducing the catalyst precursors, either as a mixture in concentrate form, or simply as the precursor complex, into the feed just prior to, or into, the reaction zone. Under reactive conditions, the catalyst of the present invention will form in situ. That is, under hydrodenitrogenation conditions, the catalyst of the present invention will form as an unsupported slurry catalyst from the metal complexes used herein.

Heteroatom removal conditions, especially hydrodenitrogenation conditions, will vary considerably depending on such things as the nature of the feed being treated, the nature of the nitrogen being removed, the nature of the complexes being removed, the nature of the complexes employed, and the extent of conversion, if any, desired. Table I gives typical conditions for hydrodenitrogenating a naphtha boiling within a range of about 25° C. to about 210° C., a diesel fuel boiling within a range from about 170° C. to 350° C., a heavy gas oil boiling within a range of from about 325° C. to about 475° C., a lube oil feed boiling within a range of from about 290° to 500° C., or residuum containing from about 10 percent to about 50 percent of material boiling above about 575° C.

TABLE I

| Feed | Temp., °C. | Pressure psig | Space Velocity V/V/Hr. | Hydrogen Gas Rate SCF/B |
|---|---|---|---|---|
| Naphtha | 100-370 | 150-800 | 0.5-10 | 100-2000 |
| Diesel | 200-400 | 250-1500 | 0.5-6 | 500-6000 |
| Heavy | 260-430 | 250-2500 | 0.3-4 | 1000-6000 |
| Lube Oil | 200-450 | 100-3000 | 0.2-5 | 100-10,000 |
| Residuum | 340-450 | 1000-5000 | 0.1-2 | 2000-10,000 |

The following examples are presented to illustrate the invention and should not be considered limiting in any way.

EXAMPLE 1

Synthesis of bis(2-ethoxyethylxanthato)Pt, (PtEEX): To a magnetically stirred solution of 6.7 g. of potassium 2-ethoxyethylxanthate, (KEEX) in 200 ml. of deionized water was added a filtered solution of potassium tetrachloroplatinate in 150 ml. of deionized water. The initial reddish-brown solution turned turbid and slowly a yellow precipitate separated out. The mixture was allowed to stir for three hours, the solid collected by filtration and washed well with deionized water. The solution was air dried and recrystallized from acetone-water to give 4.5 g. (80% conversion) as yellow-orange crystals m. p. 83°–84° C.

EXAMPLE 2

Synthesis of bis(2-ethoxyethylxanthato)Pd, (PdEEX): This compound was prepared from 9.5 g. of (KEEX) and 6.52 g. of potassium tetrachloropalladate according to the procedure given in Example 1. The product was obtained in 93% yield as a yellow shiny crystalline solid, m.p. 70° C.

EXAMPLE 3

Synthesis of tris(2-ethoxyethylxanthato)Rh, (RhEEX): This compound was synthesized from 1.92 g. of sodium hexachlororhodium(III) and 4.2 g. of KEEX according to the procedure given in Example 1. The product was obtained as a brown-orange crystalline solid, m.p. 75°–76° C.

EXAMPLE 4

This example illustrates formation and characterization of an active Pt/Mo catalyst. A 300 cc. autoclave equipped with a magnadrive stirrer was set up to permit a continuous flow of hydrogen at elevated temperature and pressure. The autoclave was charged with 75 grams of coal vacuum gas oil (VGO), and then dioxo-MoDTC (3.99 g.) and PtEEX (0.101 g.) were added. The total amount of metals added corresponded to 1 wt. % on feed (0.75 g). The mixture was stirred at 1500 rpm, and heated to 800° F. under 2000 psi $H_2$ and held at that temperature for 4 hours. Hydrogen flow was maintained at 320 cc per min. After the run the autoclave was allowed to cool to room temperature and the catalyst collected by filtration, washed with toluene, and dried at 110° C. overnight in a vacuum desiccator.

Figure 2:
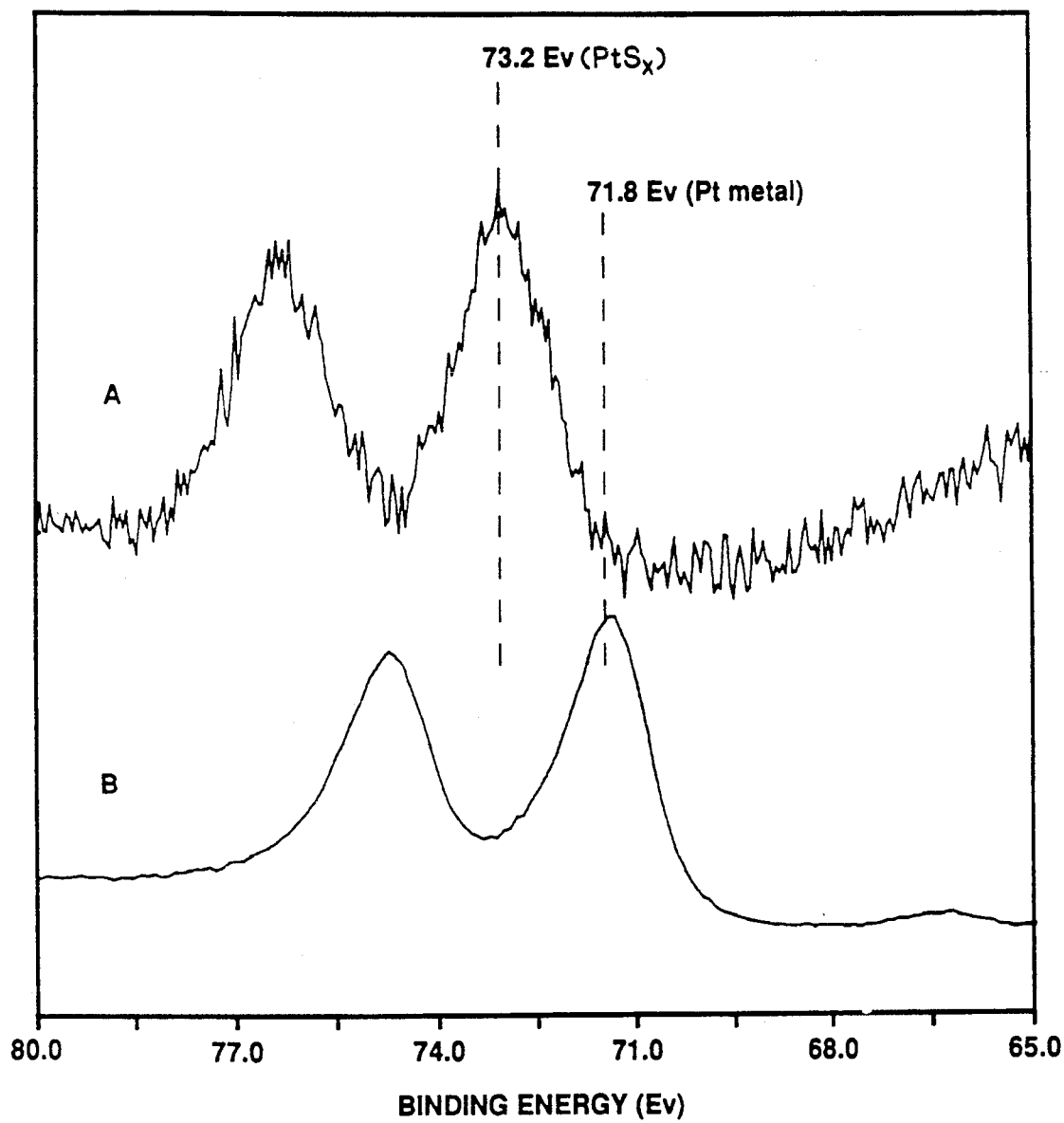
FIG. 2 is a Pt- X-ray Photoelectron Spectrum (XPS) of the catalyst of Example 4 hereof.
Figure 3:
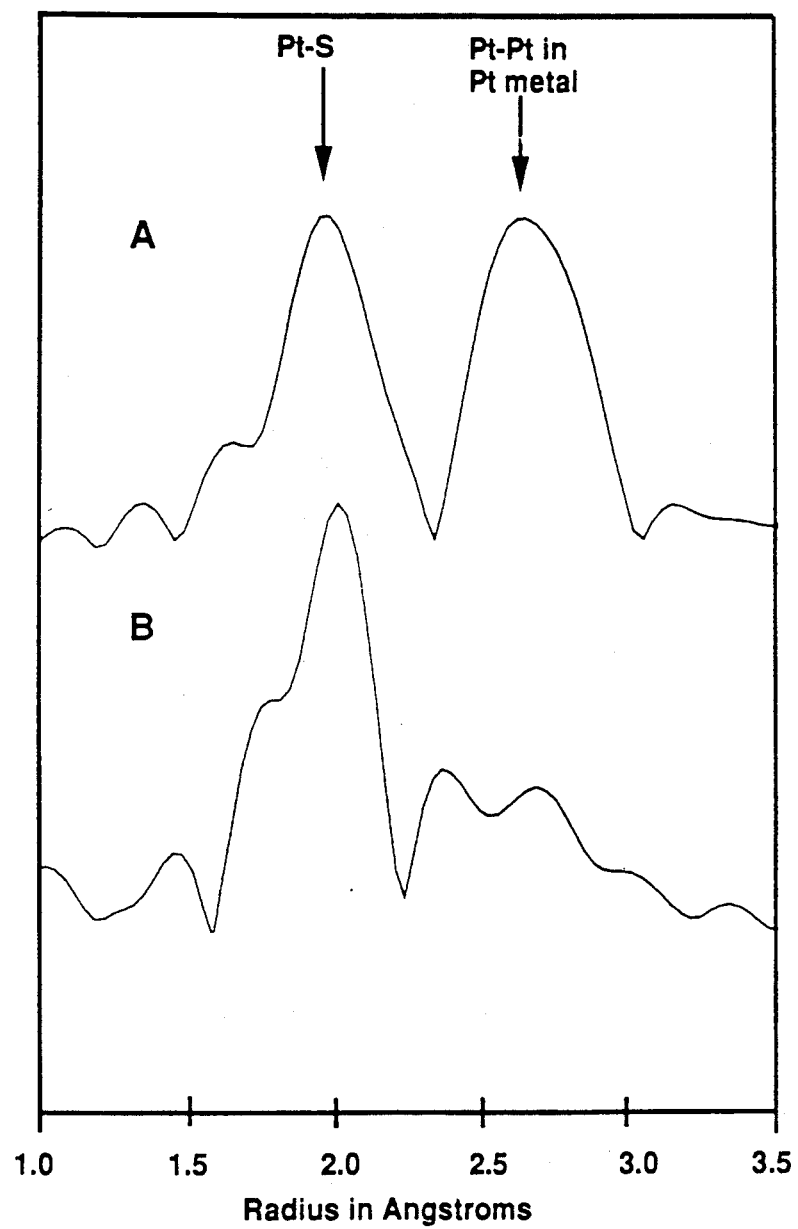
FIG. 3 is an Extended X-ray Absorption Fine-Structure (EXAFS) of the catalyst of Example 4 hereof.

Elemental analysis of the dried catalyst gave the following results: % Mo=36.22, % Pt=1.80, % S=27.4, % C=21.08, % H=2.28, % N=0.53. Analytical electron microscopy showed a highly disordered, molybdenum sulfide like structure (see FIG. 1) while the $PtS_x$ particles, if present, were below this detection limit (<20 Å). The Pt-X-ray photoelectron spectrum (XPS) illustrated in FIG. 2 shows the presence of Pt in an oxidized state (higher binding energy than for Pt metal). This has been confirmed by Extended X-ray Absorption Fine-Structure (EXAFS) studies, which indicate, as illustrated in FIG. 3, that the majority of the Pt has sulfur as its nearest neighbors, as expected for a well dispersed Pt sulfide-like phase on molybdenum sulfide.

Liquid product from the autoclave was characterized by elemental analysis and GC distillation. Under the conditions described, 96.2% HDN and 97.8% HDS were achieved. The H/C of the product was improved to 1.290 (vs. 1.019 for the feed).

EXAMPLE 5

This example illustrates the catalytic activity for coal VGO upgrading of molybdenum sulfide alone produced in situ from dioxoMoDTC. The experiment was carried out by the procedure given in Example 4 above, and 2000 ppm (0.20%) of Mo was used. In this run, 69.3% HDS, 42.2% HDN and H/C ratio of the product of 1.149 were obtained.

EXAMPLE 6

The experiment given in Example 5 was repeated with the exception that 1.0% by weight of Mo alone was used on feed. Under these conditions, 87.7 HDS and 82.0% HDN were obtained and the H/C ratio of the product was 1.261.

EXAMPLE 7

Figure 4:
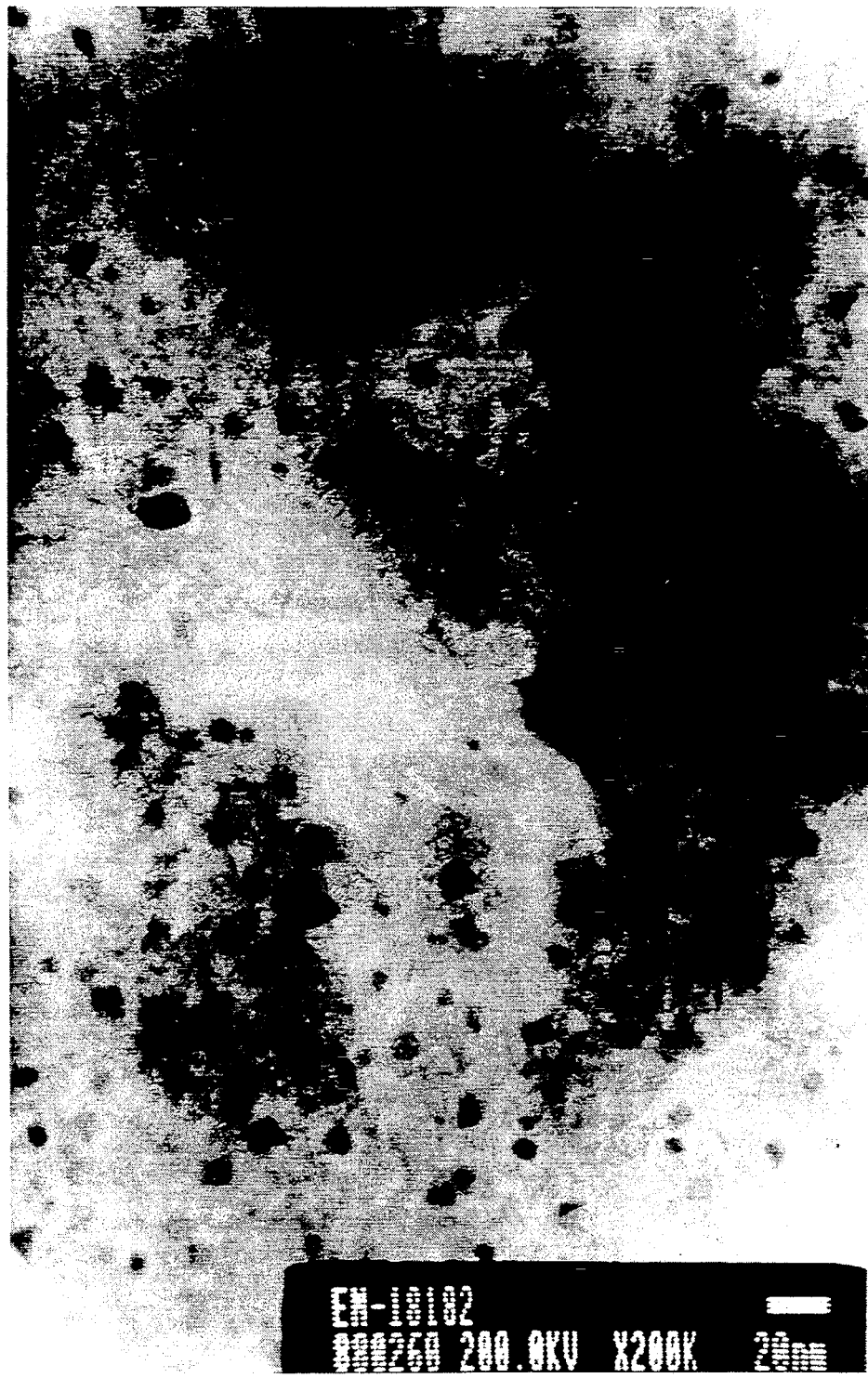
FIG. 4 is an electron micrograph of Catalyst C of Example 12 hereof which illustrates that agglomeration of Pt had occurred.

This example illustrates the decomposition of PtEEX to form relatively large Pt metal particles with low catalytic activity in the absence of Mo sulfide. Catalyst formation was carried out in the same way as described in Example 4 above, except that the only precursor added to the autoclave was PtEEX (0.403 g.). The catalyst recovered at the end of the run was examined by analytical electron microscopy, and as shown in FIG. 4 hereof, was found to contain relatively large (>100 Å diameter) dense particles, shown to be primarily Pt metal by XPS, as illustrated in FIG. 2.

Liquid product from the autoclave was analyzed as in Example 4 hereof, and it was found that a relatively low activity, with 18.5% HDN, 36.0% HDS, and H/C for the product of 1.051.

Though this amount of Pt in Example 7 was four times that used in Example 4, the catalytic activity was much poorer. From these examples it is clear that (1) in the presence of molybdenum sulfide very small and highly dispersed $PtS_x$ particles are formed; and (2) molybdenum sulfide and $Pt/S_x$ very significantly enhance the activity of each other.

EXAMPLE 8

In this example, Mo/Ni catalysts with and without noble metals were evaluated for hydrodenitrogenation (HDN) activity. Catalyst A is a commercial hydrotreating catalyst available from AKZO Chemical Inc. and is reported to be comprised of 2.5 wt. % Ni, 12.7 wt. % Mo, 6.4 wt. % $P_2O_5$, with a surface area of 135 m²/g and a pore volume of 0.38 cc/g. In catalysts B-E, the Mo and Ni precursors were dioxoMoDTC and NiEEX, while the noble metal precursors were PtEEX, and RhEEX. Autoclave runs were carried out as in Example 4 hereof. In catalysts B-E, the Mo to Ni ratio was kept at 3:1. Catalysts C-E contained 2000 ppm of Pt, Pd, or Rh, while Mo and Ni were 8000 ppm. The results are given in Table II below.

TABLE II

| HDN Activity of Catalysts of this Invention | | | |
| --- | --- | --- | --- |
| Example | Catalyst Type | % HDN | H/C Ratio |
| A | KF840 | 80.5 | 1.264 |
| B | Mo/Ni | 84.5 | 1.296 |
| C | Mo/Ni/Pt | 95.0 | 1.344 |
| D | Mo/Ni/Pd | 61.0 | 1.24 |
| E | Mo/Ni/Rh | 91.4 | 1.285 |

From these results it is clear that Pt and Rh containing microcats show exceptionally high activity for HDN. In addition, $PtS_x$ shows the highest H/C Ratio indicating its unusual effectiveness for hydrogenation.

EXAMPLE 9

Table III given in this example compares the product composition obtained in Example 8 hereof. As is clear from the table, the catalysts of this invention give lower gas make ($C_1$-$C_4$) and higher 650° F. products than obtainable from KF840.

TABLE III

| Catalysts | Product Composition From Catalytic Runs | | | |
|---|---|---|---|---|
| | $C_1$-$C_4$ | $C_1$-$C_2$ | 400° F. | 400-650° F. |
| (A) KF840 | 9.5 | 4.6 | 12.9 | 31.0 |
| (B) Mo/Ni | 7.2 | 3.45 | 11.6 | 35.7 |
| (C) Mo/Ni/Pt | 5.7 | 3.11 | 13.3 | 41.0 |
| (D) Mo/Ni/Pd | 6.4 | 3.08 | 11.8 | 42.6 |
| (E) Mo/Ni/Rh | 6.3 | 3.24 | 11.2 | 38.8 |

EXAMPLE 10

In this example, the 400°-650° F. cut of the product obtained in Example 8 was further examined for product quality. The results are given in Table IV.

TABLE IV

| Catalysts | Product Distribution in 400-650° F. Cut. HPLC Data | | | | |
|---|---|---|---|---|---|
| | Sats | 1 Ring | 2 Ring | 3 Ring | Aromatics Total |
| (A) KF840 | 18.3 | 55.1 | 18.1 | 8.5 | 81.7 |
| (B) Mo/Ni | 24.8 | 55.7 | 14.5 | 5.1 | 75.3 |
| (F) Mo | 17.6 | 56.3 | 17.7 | 8.4 | 82.4 |
| (C) Mo/Ni/Pt | 26.0 | 54.5 | 14.7 | 4.7 | 73.9 |
| (D) Mo/Ni/Pd | 17.4 | 57.0 | 18.2 | 7.6 | 82.8 |
| (E) Mo/Ni/Rh | 24.5 | 54.4 | 14.9 | 6.2 | 75.5 |

As is clear from this example the catalysts of this invention give the desired reduction in three ring aromatics and increased sats formation.

EXAMPLE 11

In this example the hydrodesulfurization activity of Catalysts A-E are compared as given for HDN in Example 8. The results are given in Table V.

TABLE V

| Catalyst | HDS Activity of Catalysts of this Invention | |
|---|---|---|
| | % Hydrodesulfurization | H/C Ratio |
| (A) KF840 | 64.8 | 1.264 |
| (B) Mo/Ni | 82.3 | 1.296 |
| (C) Mo/Ni/Pt | 59.4 | 1.344 |
| (D) Mo/Ni/Pd | 77.2 | 1.294 |
| (E) Mo/Ni/Rh | 98.4 | 1.285 |

From Table VI it is clear that one of the catalysts of this invention Mo/Ni/Rh, shows exceptionally high HDS activity.

EXAMPLE 12

In this example a series of experiments was carried out. The catalysts contained Mo/Ni and Pt but the total metal loading was kept constant at 10,000 ppm. Thus the catalyst C contained 8000 ppm of Mo and Ni and 2000 ppm of Pt, while the catalyst C3. contained 9,750 ppm Mo and Ni but only 250 ppm of Pt. The Table VI gives the results for HDS, HDN and H/C ratio. KF840 and Mo/Ni catalysts are also included for comparison.

TABLE VI

| | Catalyst | % HDS | % HDN | H/C Ratio |
|---|---|---|---|---|
| A | KF840 | 81 | 65 | 1.264 |
| B | Mo/Ni | 85 | 82 | 1.296 |
| C | Mo/Ni/Pt (2000 ppm) | 59 | 95 | 1.344 |
| | Repeat of Run 3 | 78.7 | 90.7 | 1.334 |
| C1 | Mo/Ni/Pt (1000 ppm) | 89 | 92 | 1.31 |
| C2 | Mo/Ni/Pt (500 ppm) | 91 | 93 | 1.329 |
| C3 | Mo/Ni/Pt (250 ppm) | 94 | 95.2 | 1.35 |
| C4 | Mo/Ni/Pt (50 ppm) | 91.6 | 93 | 1.309 |

As is clear from the table, highly surprising and unexpected results are obtained. Thus by decreasing the Pt content in Mo/Ni environment the HDS and HDN activities increase, demonstrating an inverse relationship with Pt concentration. This trend continues until Pt concentration is reduced to 250 ppm. At 50 ppm Pt level used in C4 the activity starts dropping again. It seems that there is an optimum concentration of Pt somewhere between 500 ppm and 50 ppm. The same trend is displayed by H/C ratio. It decreases in going from 2000 ppm to 1000 ppm and then continues to increase until 50 ppm in which case it again shows a reduction.

Figure 5:
FIG. 5 is an electron micrograph of Catalyst C3 of Example 12 hereof which shows no discernible Pt agglomeration.
Figure 6:
FIG. 6 is an electron micrograph of the catalyst of Example 7 hereof.
Figure 6:

In order to determine the reason for the highly unexpected activity behavior of these catalysts, the residues from using catalysts C and C3 were analyzed by analytical electron microscopy (AEM). It was found that Pt containing particles in catalyst C had agglomerated to give 50-125 Å crystallites, (See FIG. 4) catalyst C3 showed no discernible Pt agglomeration, implying particle sizes less than 20 Å (FIG. 5).

EXAMPLE 13

A series of runs were conducted with different soluble Mo and Pt precursors in order to establish generality of the procedure for preparing the catalysts of this invention. Runs were conducted as in Example 4 hereof, with 1% total metals on feed, and a 19:1 wt. ratio Mo:Pt. Table VIII below presents the results. Molyvan-A is a commercial Mo dithiocarbamate lubricant additive purchased from Vanderbilt Chemical Company. Molyvan-A contains about 28.8 wt. % Mo, 31.6 wt. % C, 5.4 wt. % H, and 2.5 wt. % S. SakuraLube-500 is a different (more soluble) Mo dithiocarbamate containing lubricant additive, obtained from Asahi Denka Corporation. SakuraLube-500 is comprised of about 20.2 wt. % Mo, 43.8 wt. % C, and 7.4 wt. % H, and 22.4 wt. % S. PtDTC is bis-di-n-butyldithiocarbamato Pt (II) prepared by published literature procedures.

TABLE VIII

| Precursors | % HDS | % HDN | H/C |
|---|---|---|---|
| DioxoMoDTC/PtEEX | 97.8 | 96.2 | 1.290 |
| Molyvan-A/PtEEX | 97.6 | 95.3 | 1.284 |
| SakuraLube-500/PtEEX | 98.3 | 95.7 | 1.293 |
| SakuraLube-500/PtDTC | 97.30 | 97.4 | 1.328 |

EXAMPLE 14

A series of runs were conducted with varying ratios of PtEEX and dioxoMoDTC. Runs were conducted as in Example 4, with 1% total metals on feed. Table VIII presents the results of these runs.

TABLE VIII

| Pt/Mo Ratio (wt/wt) | % HDS | % HDN | H/C |
|---|---|---|---|
| 0.005 | 93.6 | 90.5 | 1.274 |
| 0.026 | 97.0 | 94.0 | 1.316 |
| 0.053 | 96.0 | 95.8 | 1.347 |
| 0.25 | 89.7 | 98.5 | 1.450 |

Different runs in this example clearly establish that Pt/Mo combination is not limited to a certain ratio and is very active for upgrading over a very wide range.

EXAMPLE 15

A series of runs were carried out with Pt, Mo, and Co and with Pt, Mo, Co and Ni precursors for upgrading of coal VGO. Runs were conducted as in Example 4, with 1% total metals on feed. Table IX presents results of these runs.

TABLE IX

| Metals ppm | | | | | | | |
|---|---|---|---|---|---|---|---|
| Mo | Pt | Ni | Co | % HDS | % HDN | H/C | Run # |
| 7855 | 500 | 0 | 1615 | 91.0 | 94.9 | 1.322 | 101 |
| 7855 | 500 | 250 | 1365 | 95.6 | 94.8 | 1.376 | 279 |
| 8093 | 250 | 256 | 1401 | 91.6 | 92.6 | 1.325 | 283 |
| 8176 | 150 | 259 | 1415 | 90.4 | 92.9 | 1.312 | 285 |
| 8217 | 100 | 261 | 1422 | 91.3 | 92.0 | 1.297 | 290 |
| 8093 | 250 | 158 | 1499 | 89.9 | 92.8 | 1.295 | 291 |
| 8093 | 250 | 78 | 1579 | 91.1 | 92.5 | 1.283 | 292 |
| 8093 | 250 | 458 | 1199 | 91.3 | 94.4 | 1.323 | 293 |
| 8093 | 250 | 658 | 999 | 91.1 | 93.7 | 1.315 | 294 |
| 8093 | 250 | 958 | 699 | 86.5 | 93.3 | 1.301 | 295 |
| 8093 | 250 | 1158 | 499 | 88.8 | 94.1 | 1.307 | 296 |

It is clear from the table that relative ratios of the meals can be changed over a wide range and sill give catalysts which are very active for upgrading heavy feeds.

What is claimed is:

1. Process for removing sulfur and nitrogen from a hydrocarbonaceous feedstock which process comprises treating the feedstock at hydrotreating conditions, and in the presence of hydrogen, with a non-supported catalyst composition which is highly dispersed in said feedstock, which catalyst is comprised of molybdenum sulfide promoted with a noble metal such that the noble metal is in an oxidation state greater than 0 and coordinated to S.

2. The process of claim 1 wherein the noble metal is selected from Pt, Pd, Rh, and Ir.

3. The process of claim 2 wherein the noble metal is present in an amount ranging from about 0.1 to 10.0 wt. %, based on the total weight of the catalyst.

4. The process of claim 3 wherein the molar ratio of noble metal to molybdenum is from about 0.001 to 0.1.

5. The process of claim 4 wherein the noble metal is platinum and is present in an amount of 0.25 to 5.0 wt. % and the ratio of platinum to molybdenum is about 0.0025 to 0.05.

6. The process of claim 2 wherein a sulfide of a second group of metals is present, the said second group of metals is selected from the group consisting of Fe, Ni, and Co.

7. The process of claim 6 wherein the ratio of said second group of metals to molybdenum is from about 0.1 to 0.5.

8. The process of claim 2 wherein the non-supported catalyst composition is prepared from a precursor comprised of: (a) one or more noble metal complexes; and (b) one or more molybdenum complexes.

9. The process of claim 8 wherein the noble metal complex is selected from those represented by the formula $ML_2$, when the noble metal is Pt or Pd; and $ML_3$, when the noble metal is Rh or Ir, where M is the noble metal and L is a ligand selected from dithiocarbamates, dithiophosphates, dithiophosphinates, xanthates, thioxanthates, and further wherein L has organo groups having a sufficient number of carbon atoms to render the noble metal complex soluble in oil.

10. The process of claim 9 wherein the molybdenum complex is also oil soluble and highly dispersible and is selected from the compositions represented by the formulae:

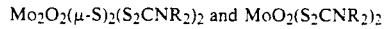

$$Mo_2O_2(\mu\text{-}S)_2(S_2CNR_2)_2 \text{ and } MoO_2(S_2CNR_2)_2$$

where R is a $C_6$ to $C_{18}$ alkyl group, a $C_5$ to $C_8$ cycloalkyl group, a $C_6$ to $C_{18}$ alkyl substituted cycloalkyl group, or a $C_6$ to $C_{18}$ aromatic or alkyl substituted aromatic group and $\mu$-S denotes a sulfide ($S^{2-}$) ligand bridging the two molybdenum atoms.

11. The process of claim 10 wherein the noble metal complex is bis(2-ethoxyethylxanthato)Pt and the molybdenum complex is dioxo bis(n-dibutyldithiocarbamato)-$Mo^{VI}$.

12. The process of claim 8 wherein said precursor further comprises one or more soluble or easily dispersible complexes of Ni, Co, and Fe.

* * * * *